United States Patent

[11] 3,549,796

[72] Inventor Engelmundus Johannes Hoefgeest
Emmasingel, Eindhoven, Netherlands
[21] Appl. No. 651,563
[22] Filed July 6, 1967
[45] Patented Dec. 22, 1970
[73] Assignee U.S. Philips Corporation
New York, N.Y.
a corporation of Delaware. by mesne assignments
[32] Priority July 6, 1966
[33] Netherlands
[31] 6609412

[54] COMBINED VIDEO AND AUDIO AMPLIFIER WITH LOW INTERMODULATION LEVEL
16 Claims, 2 Drawing Figs.

[52] U.S. Cl. .......... 178/5.8, 328/139
[51] Int. Cl. .......... H04n 5/62
[50] Field of Search .......... 178/5.8, 5.8A, 7.3E, 7.5E, 5.4; 325/318, 327; 328/139, 137; 330/(Inquired)

[56] References Cited

UNITED STATES PATENTS 3,091,659 5/1963 Massman .......... 178/5.8
3,352,964 11/1967 Hoefgeest .......... 178/5.8

*Primary Examiner*—Richard Murray
*Assistant Examiner*—John C. Martin
*Attorney*—Frank R. Trifari

ABSTRACT: A transistor intercarrier amplifier functions as an emitter follower for the video signals and as a common emitter amplifier for the audio signals. To prevent intermodulation due to variations of the internal collector-base capacitance with signal level, an audio series trap is coupled to the emitter circuit, and either a resistor or a high turns ratio transformer is coupled to the collector circuit.

PATENTED DEC 22 1970 3,549,796

Figure 1:
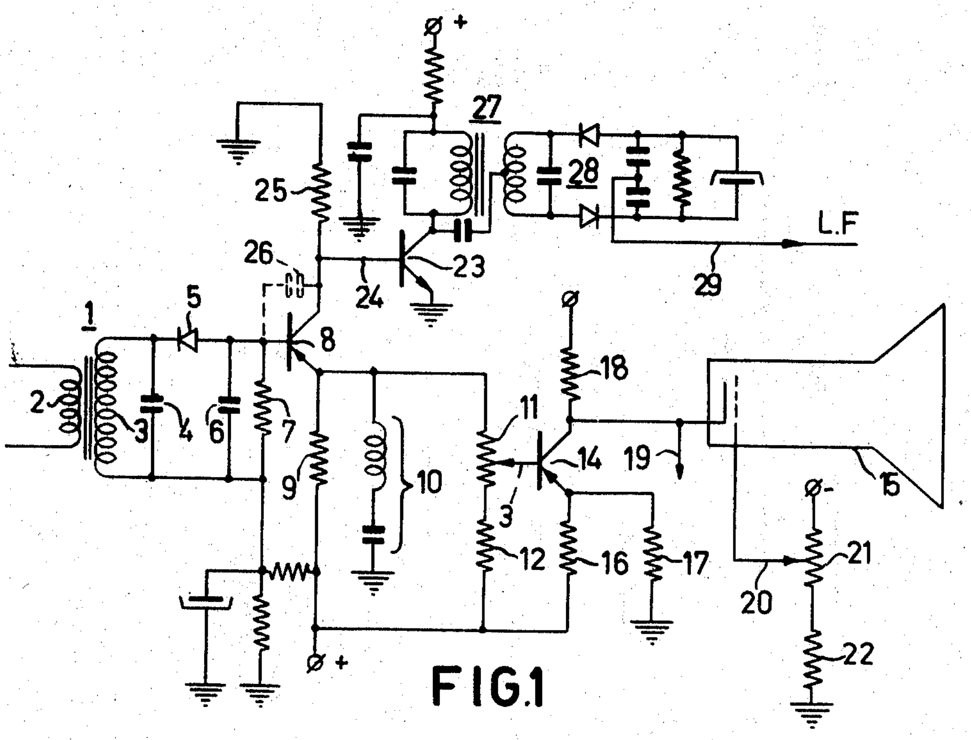

INVENTOR.

ENGELMUNDUS J. HOEFGEEST

BY

AGENT

COMBINED VIDEO AND AUDIO AMPLIFIER WITH LOW INTERMODULATION LEVEL

The invention relates to a circuit arrangement in a television receiver for the combined amplification of the video signal and the frequency-modulated sound intercarrier wave, comprising a driver transistor to the base electrode of which the signal to be amplified is applied and from the emitter electrode of which the video signal may be derived and from the collector electrode of which the sound intercarrier wave signal may be derived.

Such a circuit arrangement has the advantage that the driver stage for the video output stage is used simultaneously for amplifying the sound intercarrier wave signal so that a transistor amplifier in the intermediary frequency sound part can be saved.

However, this known circuit arrangement has the drawback that it is very difficult to avoid so-called rattle in the sound. Rattle in the sound means that the synchronization signals present in the video signal enter the sound channel. Other components present in the video signal also may be annoying but it is mainly the pulsatory synchronization signal which produce said rattle.

Increasing the selectivity of the filter which is tuned to the intercarrier wave and which is arranged in the collector circuit of the driver transistor, that is to say increasing the Q factor of the filter, gave no improvement.

According to the recognition of the invention a surprisingly simple solution of this problem is obtained if the circuit arrangement is characterized in that the impedance in the collector circuit of the driver transistor is such that variations in the stray base-collector capacity of the driver transistor produce no phase shifts in the intercarrier wave signal which is derived from its collector circuit.

The above recognition is based on the following.

A transistor always has a stray base-collector capacity. As a result of the video signal varying in amplitude voltage variations are obtained at the base electrode of the driver transistor. These voltage variations result in the barrier layer between the base and the collector space experiencing shifts. These shifts produce variations in said base-collector capacity.

If a tuned circuit (usually an LC filter of a bandfilter) is arranged in the collector circuit of the driver transistor, the tuning of the circuit will vary as a result of said capacity variation. A variation of the tuning of the circuit, however, has for its result that strong phase shifts occur in the intercarrier wave signal because the frequency thereof remains constant.

Consequently phase modulations are formed in the frequency-modulated intercarrier wave signal which are a function of the video signal. These phase variations are detected by the discriminator in the sound channel (as a matter of fact, frequency modulation is a particular form of phase modulation, so that a frequency discriminator suitable for detection of a frequency-modulated signal will also detect phase modulations, be it perhaps distorted), so that after detection the undesired rattle in the sound signal is produced in particular by the synchronization signals.

From the above it follows that the driver stage operates as a phase modulator so that in fact cross modulation occurs between the sound signal on the one hand and the video signal on the other hand.

Consequently, the result of the means provided according to the invention is that the said capacity variation produces substantially no phase shifts so that the undesired phase modulation does not occur.

Figure 2:
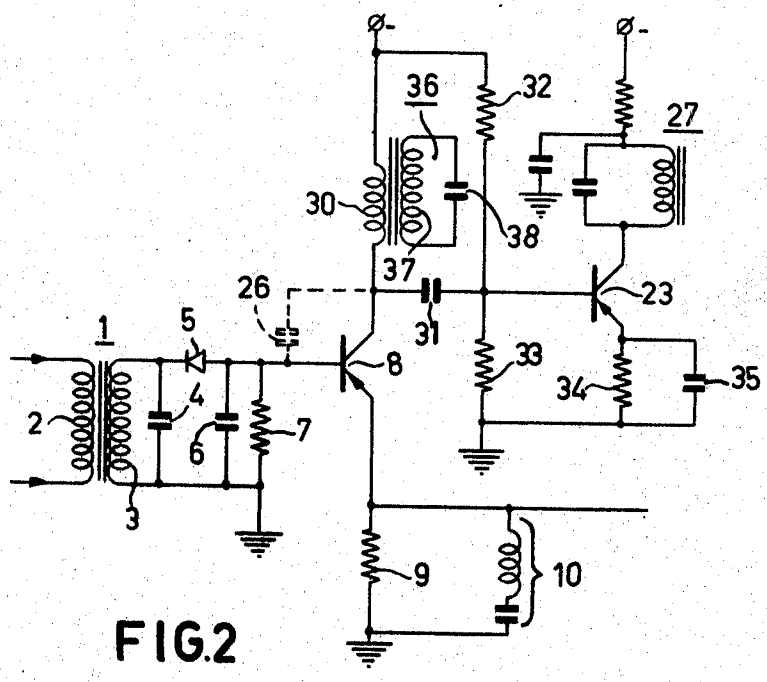

The invention will now be described in greater detail, by way of example, with reference to the accompanying FIGS., in which:

FIG. 1 is a first embodiment and FIG. 2 an embodiment which is varied with respect to FIG. 1.

Referring now to FIG. 1, the transformer 1 is the last intermediate-frequency transformer of the intermediate-frequency amplifier circuit for image and sound in a transistorized television receiver. The winding 2 is the primary of the transformer 1 which is connected to the last intermediate-frequency amplifier stage. The secondary 3 is shunted by a tuning capacitor 4 which tunes the assembly to the desired intermediate frequency. Moreover, a detector diode 5 and an RC detection filter comprising a capacitor 6 and a resistor 7 are connected to the winding 3. Consequently, the detected television signal which contains the video signal and the intercarrier wave sound signal is obtained at the anode of the detector diode 5. This signal is applied to the base electrode of the driver transistor 8. In the emitter circuit of said driver transistor 8 are included an emitter resistor 9 and a series LC circuit 10 which is tuned to 5.5 Mc/s when the circuit is meant for a 625 lines television system in which the distance between picture and sound carrier wave is 5.5 Mc/s. This filter removes the sound intercarrier wave signal from the video signal to be further amplified. It will be apparent that for other television systems the filter 10 must be tuned to a different frequency. The emitter resistor 9 is connected to the positive terminal of the supply voltage source which supplies the supply voltage for various transistors in the television receiver. The emitter electrode of the transistor 8 is further connected to a potentiometer 11 and a resistor 12 connected in series therewith the free end of which again is connected to the positive terminal of the supply voltage source. A variable tap 13 of the potentiometer 11 is connected to the base electrode of the transistor 14 serving as a video amplifier. It will consequently be clear that the contrast of the picture to be reproduced with the picture tube 15 can be adjusted with the variable tapping 13. The emitter electrode of the transistor 14 is connected at one end to the positive terminal of the supply voltage source through a resistor 16 and at the other end is connected to earth through a resistor 17.

The collector electrode of the transistor 14 is connected to the negative terminal of the supply source through the output resistor 18 and is further connected to the cathode of the picture tube 15 so that the amplified video signal is applied to said cathode. At the same time the overall video signal may be applied, from the collector electrode of the output transistor 14 and through the line 19, to the synchronization separator which separates the synchronization signal from the overall signal.

Finally it is to be noted that the control electrode of the picture tube 15 is connected to the variable tap 20 of the potentiometer 21 which is connected in series with an ohmic resistor 22, which series arrangement is connected to the negative terminal of a supply voltage source. The negative supply voltage for the resistors 21 and 22 and that for the free end of the output resistor 18 may be derived from a rectifier in the line output stage of the television receiver. However, it will be obvious that if such a rectifier is to be saved the supply voltages can also be derived from the common anode voltage apparatus of the receiver. Polarities other than those described here are alternatively possible when transistors of the NPN-type are used instead of transistors of the PNP-type.

According to the principle of the invention a purely ohmic resistor 25 is chosen in the example shown in FIG. 1 as an impedance in the collector circuit of the transistor 8. In addition, in this embodiment the coupling between the collector electrode of the transistor 8 and the base electrode of the first sound intermediate-frequency transistor amplifier 23 is effected in a very simple manner by means of the direct connection 24. Also when the stray capacity 26 between the collector and base electrode of the transistor 8 varies as a result of the video signal applied to the base electrode of the transistor 8, this will not result in any phase shifts in the amplified intercarrier wave signal as a result of the ohmic character of the resistor 25. Because the resistor 9 causes a strong negative feedback coupling for the video signal, but not for the intercarrier wave signal, because for the frequency of this intercarrier wave signal the negative feedback coupling is short-circuited by the circuit 10, said video signal no longer occurs in the output signal through the resistor 25. Therefore, the synchronization pulses cannot influence the stray capacity which is also present in the transistor 23. Therefore the surprising fact occurs that replacement of a filter which is specially tuned to the intercarrier wave frequency to pass only this intercarrier wave signal of, for example, 5.5 Mc/s, and to cut off the video signals with frequencies between, for example, 0 and 5 Mc/s, by an ohmic resistor 25 causes the said rattle to disappear from the sound.

The handling of the sound intercarrier wave signal in the sound channel is further effected in normal manner because a bandfilter 27 tuned to the intercarrier wave frequency is arranged in the collector circuit of the transistor 23 to which filter a frequency discriminator 28 is connected so that the low frequency signal which may be applied to a low frequency amplifier can be derived from the line 29.

This way of coupling is not only better because as a result of this the rattle in the sound disappears but in addition it is considerably cheaper because an additional bandfilter is saved which otherwise effects the coupling between the transistors 8 and 23. In addition, as a result of the DC connection 24 it is not necessary to use an additional potentiometer which provides the preadjustment of the transistor 23.

A second method of preventing the undesired phase shifts is shown in the embodiment of FIG. 2. In this embodiment a primary 30 of a transformer is connected in the collector circuit of the driver transistor 8 and the coupling between the collector electrode of the transistor 8 and the base electrode of the transistor 23 is effected by a coupling capacitor 31. The coupling capacitor is provided in the first place because the winding 30 is connected directly to the negative supply voltage and a separate potentiometer comprising the resistors 32 and 33 is necessary to adjust the desired bias voltage for the transistor 23. Finally, a bias voltage network comprising a resistor 34 and a capacitor 35 is included in the emitter line of the transistor 23.

A secondary 37 which, together with the capacitor 38, constitutes a circuit which is tuned to the intercarrier wave frequency which may, for example, 5.5 Mc/s, is connected to the primary 30. The winding 30 only has a small number of turns $n_1$ and the secondary 37 has a large number of turn $n_2$. If the secondary inductance $L_2$ of the winding 37 is transformed to the collector side, a value $L_p=\left(\frac{n_1}{n_2}\right)^2 L_2$ is found for the inductance which is effectively active in the collector circuit.

If the capacity $C_2$ of the capacitor 38 is transformed to the collector circuit it is found that:

$$C_p=\left(\frac{n_2}{n_1}\right)^2 C_2$$

For a practical embodiment $n_1=3$, $n_2=25$, $L_2=8\ \mu H$ and $C_2=100$ pF.

It is then found that:

$$L_p=\frac{9}{625}\,8.10^{-6}\cdot H \qquad 10^{-7}H$$

$$C_p=\frac{625}{9}\cdot 10^{-10} \qquad 7.10^{-9}=7.000\Delta pF.$$

Herewith it is reached that a tuned circuit is present in the collector circuit of the driver transistor 8 having a comparatively very small inductance and a comparatively very large capacity. The base-collector capacity 26 which is in the order of 1 to 1.5 pF may be considered parallel to said tuning capacity $C_p$ from a point of view of alternating current.

When this capacity 26 varies as a result of the applied video signal, this variation will maximally be a part of a pico Farad, for example, 0.2 to 0.3 pF. It will be obvious that such a small variation with respect to the 7000 pF of the tuning capacitor results in a negligible frequency variation $\Delta f$. If this frequency variation is negligibly small, however, the resulting phase shift of the tuned circuit will also be negligibly small.

In other words in this manner it is also reached that a variation of the base-collector capacity does not result in any undesired cross modulation.

This method has the additional advantage that high frequencies in the video signal are prevented from penetrating to the transistor 23 by the tuned circuit 36.

Although in FIG. 2 a circuit arrangement is described having a transformer in the collector circuit of the transistor 8, it will be obvious that in principle also an LC circuit can be directly included in said collector circuit having a comparatively very small inductance value $L_p$ and a comparatively very large capacity value $C_p$. However, as appears from the above-given numerical example such small values of $L_p$ are obtained that this is not realizable with the conventional means (that is to say wire-wound coils). By using the above described transformer having a small $n_1$ and a large $n_2$, however, this problem can be solved.

I claim:

1. A circuit for the common amplification of first and second signals of first and second frequencies respectively, comprising means for amplifying having first and second conduction electrodes and a control electrode and a variable internal capacitance between said first conduction electrode and said control electrode; means for receiving and applying the two signals to said control electrode; and means for preventing said first signal from interfering with said second signals due to variations in said internal capacitance, including a pure resistive load coupled to said first conduction electrode and means for eliminating signals of said second frequency from said second conduction electrode.

2. A circuit as claimed in claim 1 wherein said eliminating means comprises a series tuned circuit coupled to said second conduction electrode and tuned to said second frequency.

3. A circuit as claimed in claim 1 wherein said amplifying means comprises a transistor having collector, emitter, and base electrodes serving as said first, and second, and control electrodes respectively.

4. A circuit as claimed in claim 1 wherein said receiving and applying means comprises a detector.

5. A circuit as claimed in claim 1 wherein said first and second signals comprise video and audio signals respectively.

6. A circuit as claimed in claim 1 further comprising means for receiving said signals of said second frequency from said first conduction electrode.

7. A circuit as claimed in claim 6 wherein said receiving means comprises a transistor having a base electrode directly coupled to said first conduction electrode.

8. A circuit as claimed in claim 1 further comprising means for receiving signals of said first frequency from said second conduction electrode.

9. A circuit for the common amplification of first and second signals of first and second frequencies respectively; comprising means for amplifying having first and second conduction electrodes and a control electrode and a variable internal capacitance between said first conduction electrode and said control electrode; means for receiving and applying the two signals to said control electrode; and means for preventing said first signal from interfering with said second signal due to variations in said internal capacitance, including a capacitor and a transformer having a primary coupled to said first conduction electrode and a secondary coupled across said capacitor; the number of turns of said secondary being much greater than the number of turns of said primary, and means for eliminating signals of said second frequency from said second conduction electrode.

10. A circuit as claimed in claim 9 wherein said eliminating means comprises a series tuned circuit coupled to said second conduction electrode and tuned to said second frequency.

11. A circuit as claimed in claim 9 wherein said amplifying means comprises a transistor having collector, emitter, and base electrodes serving as said first, and second, and control electrodes respectively.

12. A circuit as claimed in claim 9 wherein said receiving and applying means comprises a detector.

13. A circuit as claimed in claim 9 wherein said first and second signals comprise video and audio signals respectively.

-$. A circuit as claimed in claim 9 further comprising means for receiving said signals of said second frequency from said first conduction electrode.

15. A circuit as claimed in claim 14 wherein said receiving means comprises a transistor having a base electrode coupled to said first conduction electrode by a second capacitor.

16. A circuit as claimed in claim 9 further comprising means for receiving signals of said first frequency from said second conduction electrode.

PO-1050
(5/69)

UNITED STATES PATENT OFFICE
CERTIFICATE OF CORRECTION

Patent No. 3,549,796 Dated December 22, 1970

Inventor(s) ENGELMUNDUS JOHANNES HOEFGEEST

It is certified that error appears in the above-identified patent and that said Letters Patent are hereby corrected as shown below:

In the Claims, col. 4, line 73. cancel "-$" and insert

-- 14 --;

Signed and sealed this 28th day of January 1975.

(SEAL)
Attest:

McCOY M. GIBSON JR.
Attesting Officer

C. MARSHALL DANN
Commissioner of Patents